United States Patent [19]
Seidel

[11] 4,273,963
[45] Jun. 16, 1981

[54] AUTOMATIC EQUALIZATION FOR DIGITAL TRANSMISSION SYSTEMS

[75] Inventor: Harold Seidel, Warren, N.J.

[73] Assignee: Bell Telephone Laboratories, Incorporated, Murray Hill, N.J.

[21] Appl. No.: 42,453

[22] Filed: May 25, 1979

[51] Int. Cl.³ .............................................. H04B 3/14
[52] U.S. Cl. ................................. 179/16 F; 333/18; 333/28 R; 375/14
[58] Field of Search .................. 179/1 A, 1 D, 16 F, 179/16 EA, 170 R, 170 D; 333/18 R, 28 R; 178/63 E; 375/11, 12, 14

[56] References Cited

U.S. PATENT DOCUMENTS

| | | | |
|---|---|---|---|
| 3,383,616 | 5/1968 | Friend et al. | 330/26 |
| 3,568,100 | 3/1971 | Tarbox | 333/18 |
| 3,624,539 | 11/1971 | Kao et al. | 333/28 R |
| 3,652,952 | 3/1972 | Chen | 330/57 |
| 3,671,886 | 6/1972 | Fudemoto et al. | 333/18 |
| 3,728,649 | 4/1973 | Waldhauer | 333/28 R |
| 3,857,048 | 12/1974 | de Laage de Meux et al. | 333/18 |
| 3,919,502 | 11/1975 | Daryanani | 179/170 D |
| 3,949,325 | 4/1976 | Berkovitz | 333/28 R |
| 4,004,102 | 1/1977 | Ott | 179/16 F |
| 4,028,644 | 6/1977 | Niiro | 333/28 R |
| 4,174,470 | 11/1979 | Seidel | 179/170 D |

Primary Examiner—John H. Wolff
Assistant Examiner—Randall P. Myers
Attorney, Agent, or Firm—Robert O. Nimtz

[57] ABSTRACT

An automatic equalizer for digital transmission systems is disclosed including a variable gain amplifier in one branch of a two-branch admittance circuit. The branch including the amplifier includes two frequency-dependent admittances while the other branch is insensitive to frequency. Varying the gain of the amplifier provides a minimum phase network which can be automatically adjusted to compensate for varying lengths and gauges of telephone pairs. This configuration permits digital transmission in the subscriber loop plant at rates up to 200 kilobits per second.

11 Claims, 8 Drawing Figures

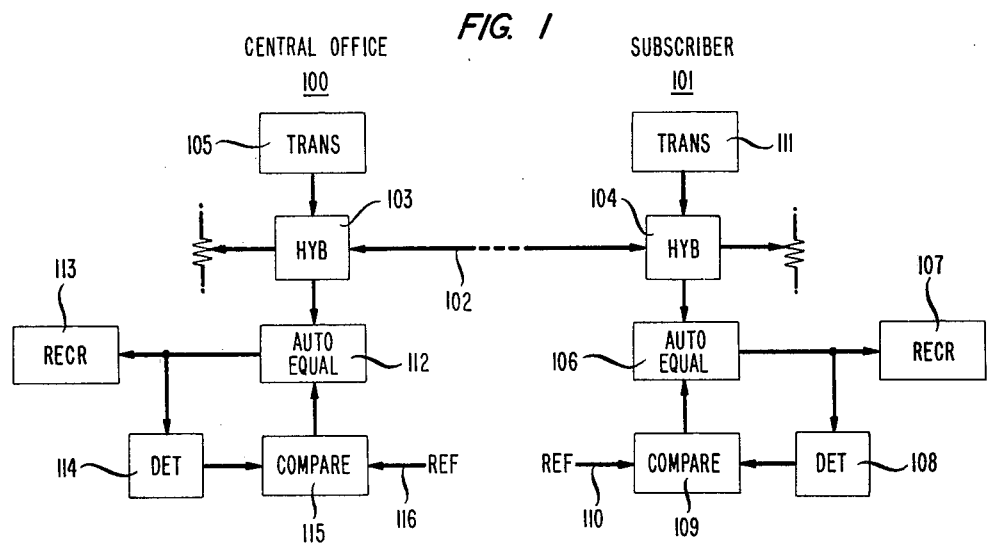
FIG. 1
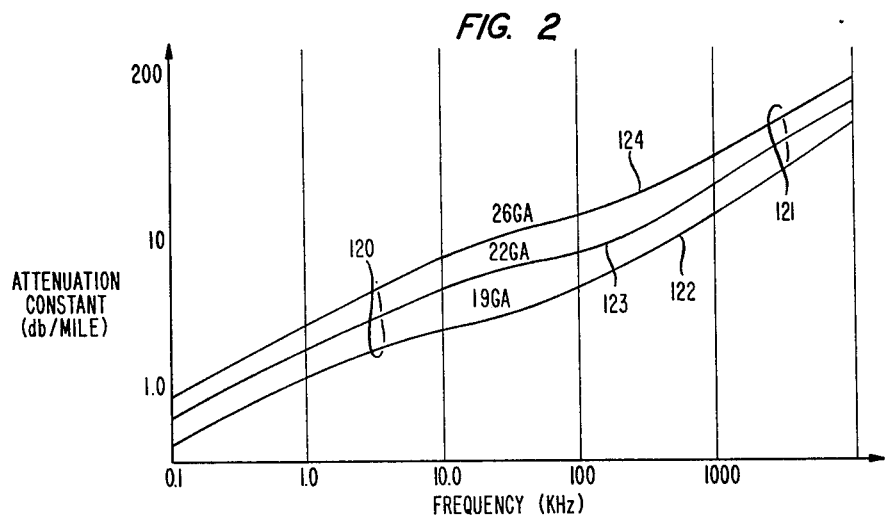
FIG. 2
FIG. 3

AUTOMATIC EQUALIZATION FOR DIGITAL TRANSMISSION SYSTEMS

BACKGROUND OF THE INVENTION

1. Field of the Invention

This invention relates to digital transmission systems and, more particularly, to automatic equalizer circuits for differing lengths of transmission cable in such systems.

2. Description of the Prior Art

In digital transmission systems using telephone cables, pulses of substantially uniform amplitude and duration are transmitted between terminal facilities separated by various lengths of twisted pairs of conductors. At the terminals, the receiver must distinguish, during each digit period, between the presence and absence of a pulse and, for each pulse detected, regenerate a new pulse for decoding.

Due to the frequency-dependent nature of the twisted pair, it is necessary to provide equalization for the frequency distortion which takes place in the transmission cable. Moreoever, since the attenuation characteristic of a twisted pair is a function of cable length, equalization must be adjustable for differing cable lengths. As a result, it is normally necessary to employ a variable line equalizer network which, when connected in tandem with the section of telephone cable, compensates for the frequency-dependent characteristic of the connected cable section.

It can be seen that the provision of a line equalizer network is an essential part of the design requirement for a digital transmission system. Moreover, these line equalizer networks must be designed so as to provide the appropriate gain characteristics to compensate for the attenuation of a wide variety of different cable lengths and gauges. This requirement would normally require the stocking of a large number of different networks, measuring the characteristics of the cable section in question and selecting and adjusting a network to provide the desired compensation. This procedure would require a large inventory of networks as well as manual procedures for measuring cable sections and for adjusting the network.

It is known in the prior art to provide a line equalizer which automatically adapts to the particular length and gauge of cable to which it is connected. One such network is disclosed in R. A. Tarbox U.S. Pat. No. 3,568,100, granted Mar. 2, 1971. The Tarbox equalizer utilizes an electronically controlled gain circuit responsive to the characteristics of the line to adjust the frequency shaping of the gain so as to provide automatic equalization for different lengths and gauges of cable. The Tarbox circuit arrangement used a variable impedance network having a single pole which is movable in the frequency domain in response to a derived control signal. This arrangement provides an approximately correct high frequency compensation for most lengths and gauges of cable in the telephone plant and is suitable for high frequency pulse transmission systems such as the T-1 carrier system operating at 1.544 megabits.

The Tarbox arrangement provides a linear low frequency gain characteristic and adjusts the shape of the high frequency gain characteristic in response to the automatic measurement. The assumption that the low frequency characteristic is linear, however, provides totally inadequate equalization for systems in which the low frequency components of the pulse signals are of significant magnitude since such sections of cable do, in fact, have nonlinear low frequency characteristics.

SUMMARY OF THE INVENTION

In accordance with the illustrative embodiment of the present invention, equalization for variable lengths of telephone cable is accomplished with a circuit which provides frequency-shaped gain having three regions of gain variation. In the low frequency range, the logarithm of gain increases as the square root of frequency. In the midrange, the gain changes more slowly with frequency. In the upper frequency range, the logarithm of gain again varies as the square root of frequency. Attenuation at low frequencies (0–10 kHz) is caused by the series resistance and shunt capacitance line parameters. In the upper frequency range (100 kHz–10 mHz), the skin effect predominates and again attenuation is related to the square root of frequency. In the midrange (10–100 kHz), the attenuation of the line is in a lower sensitivity transition region. In order to compensate for the overall line attenuation for various lengths of line, a gain versus frequency characteristic is synthesized which provides properly shaped compensation for all frequencies, line lengths and gauges.

More particularly, the equalizer comprises a variable gain amplifier which is used to differentially combine two admittance functions, both having significant variations with frequency, and to vary the proportion between this difference and a constant, frequency-insensitive admittance function. The gain of the variable gain amplifier is used as the independent variable in controlling this proportion. The constant admittance function provides for the characteristic of the cable when it is vanishingly short. The frequency-sensitive characteristics tend to offset each other, one being prominent at low frequencies and the other at high frequencies, but tending to neutralize one another in the midrange portion. Since the composite frequency sensitivity is proportional to the actual length of the cable, the effect of the variable gain amplifier is to heighten the effect of this frequency-sensitive circuit portion with increasing cable length. Thus, the combination of these two frequency-sensitive admittance functions with the constant admittance function provides an overall gain characteristic which closely compensates for the attenuation of a telephone cable pair of any gauge or length.

One major advantage of realizing line equalizers in accordance with the present invention is the ability to use a single gain adjustment to compensate for various lengths and gauges of telephone cable. A single equalizer design can therefore be manufactured and installed in the field without concern for the length or gauge of the connected cable. Other advantages include a minimum phase shift design and the ability to cascade such equalizers and to employ staged turn-on of the cascaded equalizers, thus minimizing ripples in the overall combined equalization characteristic. Moreover, these equalizers can be realized in integrated circuit form, using charge-coupled devices.

Realization of the line equalizer described above produces a real frequency locus on an impedance chart which does not include zero. That is, the equalizer is a minimum phase network and, in accordance with Bode's Law, produces zero net phase distortion across the entire frequency band when it produces a flat compensation of the cable.

Automatic equalizers in accordance with the present invention are particularly suitable for wideband digital transmission at baseband in the subscriber loop plant. When combined with a wideband electronic hybrid, such as that shown in the copending application of the present applicant, Ser. No. 949,577, filed Oct. 10, 1978, the automatic equalizer of the present invention, with the network values as shown, permits flat transmission over a 200 kilobit per second range on most standard two-wire telephone subscriber loops. It is to be noted that, with other choices of element values, the circuit format disclosed provides a general adaptive compensation technique for other frequency ranges. The present invention will, for convenience, be described in connection with a 200 kilobit subscriber loop system.

BRIEF DESCRIPTION OF THE DRAWINGS

In the drawings:

FIG. 1 is a block diagram of a two-wire digital transmission system using automatic equalizers in accordance with the present invention;

FIG. 2 is a logarithmic graphical representation of the per unit length attenuation versus frequency characteristics of several different gauges of typical sections of telephone cable which might interconnect the terminals of the digital transmission system of FIG. 1;

FIG. 3 is a general block diagram of the admittance synthesizing portion of the equalizer networks of FIG. 1 and which compensates for the attenuation characteristics shown in FIG. 2;

DETAILED DESCRIPTION

Figure 4:
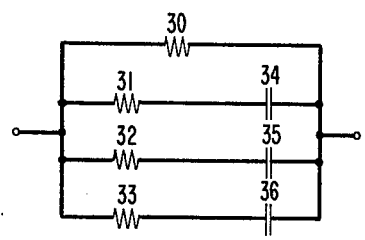
FIG. 4 is a circuit diagram of the low frequency admittance $Y_A$ required for the realization of the circuit of FIG. 3.

In FIG. 1 there is shown a block diagram of a digital transmission system using automatic equalizer networks in accordance with the present invention. The system of FIG. 1 comprises a central office terminal 100 and a subscriber terminal 101. A standard two-wire twisted pair 102 interconnects the central office terminal 100 with the subscriber terminal 102. Electronic hybrids 103 and 104 terminate pair 102 at the central office and subscriber locations, respectively. These hybrids may take the form shown in the aforementioned copending application of the present applicant, or may comprise any other wideband hybrid available.

A transmitter 105 transmits a stream of digital data signals in any desirable format. A bipolar amplitude-shift-keyed (ASK) waveform for the digital signal is particularly suitable since it has little power at the very low frequencies (less than 100 Hz) and hence signals induced from power lines can be filtered out with a low-pass filter. Signals from transmitter 105 are delivered via hybrid circuit 103 to transmission line 102. At hybrid circuit 104, the signals from transmitter 105 are delivered to automatic line equalizer 106. Equalizer 106 compensates for the frequency distortion introduced by line 102. The output of equalizer 106 is simultaneously applied to receiver 107 and to peak detector 108. Receiver 107 recovers the original digital pulse stream from the received signal. Detector 108 detects the peak magnitude of the received pulse signal and delivers a signal proportional to this magnitude to compare circuit 109. The remaining input to compare circuit 109 is a reference signal on lead 110. The output of compare circuit 109 is used to adjust equalizer 106 so as to insure complete compensation.

Since the effect of frequency distortion on transmitted pulse signals is to smear the pulse amplitude in time by providing different attenuation of different frequency components, it is possible to use the received pulse amplitude as a measure of frequency distortion. Thus, the reference signal on lead 110 is set at a level corresponding to the peak amplitude of a received pulse which is subject to little or no distortion. Peak detector 108 detects the actual pulse peak and, by way of comparison circuit 109, generates a signal to adjust equalizer 106 so as to increase the amplitude of the received pulse, i.e., to remove the frequency distortions. When the peak magnitude of the received pulse is equal to the magnitude of the signal on lead 110, the output of compare circuit 109 no longer changes and equalizer 106 remains at this adjustment.

Transmission takes place in the system of FIG. 1 in the opposite direction in substantially the same way. Pulse signals originating at transmitter 111 are transmitted via hybrid 104, subscriber loop 102 and hybrid 103 to equalizer 112. The output of equalizer 112 is supplied to receiver 113 and peak detector 114. The output of peak detector 114 is supplied to compare circuit 115, as is a reference signal on lead 116. The output of compare circuit 115 is applied to equalizer 112 to adjust this network so as to exactly compensate for the frequency distortions in loop 102.

It will be noted that wideband pulse transmission takes place in both directions simultaneously on subscriber loop 102. This is a distinct advantage over many current systems which require separate transmission lines for the opposite directions of transmission, or require alternative nonsimultaneous transmissions in the opposite directions. Such simultaneous transmission is possible over a broad band of frequencies for the sole reason that hybrids 103 and 104 maintain signal balances over this broad range of frequencies and equalizers 106 and 112 are capable of compensating for frequency distortions over the entire transmission band. Prior art systems, such as that shown in the above-mentioned Tarbox patent, transmitted energy in a much higher frequency range and hence did not require careful balance or compensation at the low frequency end.

Referring then to FIG. 2, there is shown a graphical representation of the attenuation versus frequency characteristics for typical telephone cable sections of various gauges. In FIG. 2 both the frequency and the attenuation are logarithmically scaled to make the various frequency dependencies more apparent. In the low frequency portion (0–10 kHz) of FIG. 2, the attenuations for the various gauges of wires can be seen to be straight line functions 120. In this frequency range, the resistance and capacitance per unit length of the telephone cable is dominant and the attenuation is proportional to the square root of frequency. In the high frequency range (>100 kHz), the skin effect becomes predominant. The attenuation characteristics, however, are again straight line functions 121 and are also approximately proportional to the square root of frequency. These two ranges are separated by an intermediate range where the attenuation is less sensitive to frequency.

In FIG. 2 it can also be seen that the characteristics for the various gauges follow each other very closely in shape. Indeed, the 19-gauge characteristic 122 is almost exactly equal to 0.6 times the 22-gauge characteristic 123, while the 26-gauge characteristic 124 is almost exactly equal to 1.7 times the 22-gauge characteristic 123. In accordance with the present invention, a circuit which compensates for the 22-gauge characteristic 123 is synthesized. The 19- and 26-gauge characteristics are treated as if they were different lengths of 22-gauge cable. This simplifies the equalizer design and permits intermediate adjustments for mixed gauge sections where the combined attenuation characteristic lies somewhere between the fixed gauge characteristics shown in FIG. 2.

In accordance with the present invention, an overall compensating gain characteristic of the form shown in FIG. 2 is synthesized by varying the gain in one circuit branch including two different frequency-dependent admittances and combining the output of this branch with the output of a second branch including a frequency-insensitive admittance. One of the frequency-dependent admittances provides the low frequency compensation for the cable while the other frequency-dependent admittance compensates for the high frequency behavior. By selectively steering input signals through these two branches, overall compensation of the attenuation shown in FIG. 2 is produced, providing smooth transitions between the three frequency regions. A variable gain amplifier can be used to both steer the input signal and vary the effect of the frequency-dependent admittance branch to compensate for different lengths of cables. The frequency-insensitive admittance path provides unit gain for the overall circuit when the amplifier gain is reduced to zero, corresponding to a zero length cable section. A circuit for realizing the equalizer is shown in FIG. 3.

Referring more particularly to FIG. 3, there is shown a block diagram of an automatic line equalizer in accordance with the present invention. The circuit of FIG. 3 comprises an input transistor 10 which provides a high impedance isolation of the input to the network. Transistor 10 is connected in the emitter-follower configuration using an emitter resistor 11 connected to ground potential. The emitter of transistor 10 is connected to the input of a variable gain amplifier 12 as well as to a frequency-insensitive admittance (resistor 13). Amplifier 12 provides a double-ended output, positive on lead 14 and negative on lead 15.

Admittance 16 is connected to lead 14 while admittance 17 is connected to lead 15. The remaining terminals of admittances 13, 16 and 17 are connected together and to the emitter of commom base transistor 18. The base of transistor 18 is connected to ground potential while the collector of transistor 18 is connected to the output terminal 19. A resistor 20, having the same value as resistor 13, is connected from the collector of transistor 18 to a negative voltage supply 21.

The configuration of FIG. 3 provides a gain versus frequency characteristic of the shape shown in FIG. 2. If the gain of amplifier 12 is adjusted to a zero value (which corresponds to a zero length line), the constant admittance $Y_0$ provides unit gain for the overall circuit and thus makes it transparent to applied signals. As the gain of amplifier 12 is increased, more and more of the frequency-dependent characteristics of admittances 16 and 17 are combined with this zero length response. The shape of the overall characteristic gradually and smoothly assumes the shape of the characteristics depicted in FIG. 2. For particular settings of the gain of amplifier 12, the overall characteristic will assume the shape shown in FIG. 2 and exactly compensate for a corresponding length and gauge of telephone cable. The gain of amplifier 12 can be adjusted to other settings to provide appropriate equalizer characteristics for cable sections of other gauges and lengths. Since the difference between gauges is essentially a simple multiplication factor, the adjustable gain of amplifier 12 permits automatic adjustment for gauge as well as length.

In FIG. 4 there is shown a detailed circuit diagram of the per unit admittance represented by admittance 16 in FIG. 3. Admittances 13 and 20 are normalized to unity and all values in FIGS. 4 and 5 can be scaled upward by any desired factor. The circuit in FIG. 4 is a resistive-capacitive circuit comprising a plurality of parallel branches. One branch includes a resistor 30 while each of the other branches includes a series combination of a resistor and capacitor. Thus, each of resistors 31, 32 and 33 is connected in series with a respective one of capacitors 34, 35 and 36. The per unit values of the components of FIG. 4 are given in the following table:

TABLE I

R30=13.8700 ohms
R31=0.5330 ohms
R32=0.6200 ohms
R33=0.2626 ohms
C34=76.6500 microfarads
C35=8.1600 microfarads
C36=2.3917 microfarads A scaling can be applied to the above values to change each value by the same factor, thus permitting realization with many different circuit components.

Figure 5:
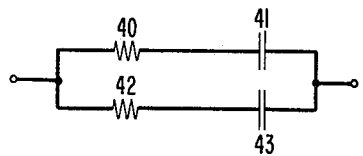
FIG. 5 is a circuit diagram of the high frequency admittance $Y_B$ required to realize the circuit of FIG. 3.

In FIG. 5 there is shown a resistance-capacitance circuit which can be used to realize the admittance 17 in FIG. 3. The network of FIG. 5 comprises two parallel branches, each having a resistor and a capacitor in series. Thus, resistor 40 is connected in series with capacitor 41 and resistor 42 is connected in series with capacitor 43. The per unit values of these components are given in Table II.

TABLE II

R40=0.7258 ohms
R42=1.0865 ohms
C41=41.9610 microfarads
C43=3.2150 microfarads

Again, these values can be multiplied by the same scaling factor to permit realization with particular circuit elements.

Figure 6:
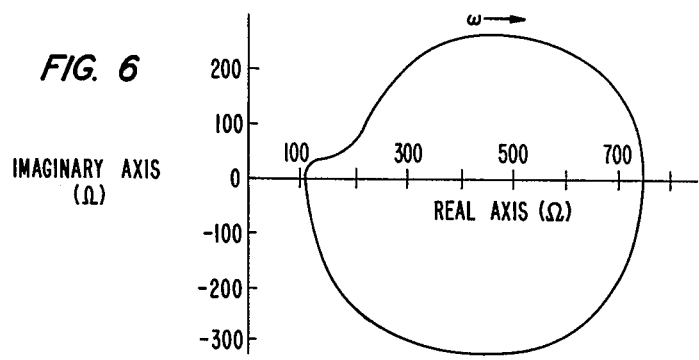
FIG. 6 is a polar coordinate impedance plot of the circuit of FIG. 3.

In FIG. 6 there is shown a polar coordinate plot of the combined admittance function realized with the circuit of FIG. 3. That is, FIG. 6 represents the combined real (horizontal axis) and imaginary (vertical axis) parts of the complex admittance as frequency is varied from zero to infinity. This plot expands and contracts with variations in the gain of amplifier 12. When this gain goes to zero, the plot collapses to a point on the real axis at the value of resistors 13 and 20.

It will be noted that the plot of FIG. 6 does not include the origin. This is the criterion for a minimum phase network. Thus, the network of FIG. 3 is such a minimum phase network and introduces no phase distortion into the signal while closely compensating for amplitude distortions. This is an important characteristic for an equalizer since phase distortion could be just as serious a problem as amplitude distortion.

Figure 7:
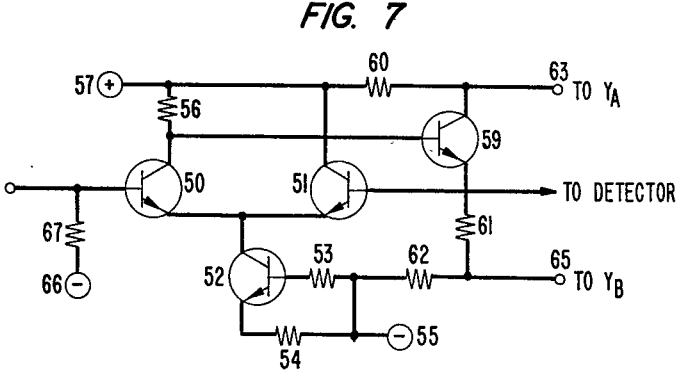
FIG. 7 is a detailed circuit diagram of a variable gain amplifier circuit suitable for use in the equalizer network of FIG. 3.

In FIG. 7 there is shown a detailed circuit diagram of a variable gain amplifier suitable for use as amplifier 12 in FIG. 3. The amplifier of FIG. 7 includes a long-tailed pair comprising transistors 50 and 51 having their emitters connected together through a constant current source, including transistor 52, base resistor 53 and emitter resistor 54, to negative voltage source 55. The collector of transistor 50 is connected through resistor 56 to positive voltage source 57. The collector of transistor 51 is connected directly to source 57. The gain control signal is applied to the base of transistor 51. The base of transistor 50 is biased from source 66 through resistor 67 and comprises the signal input to the variable gain amplifier. The value of voltage source 66 is selected to provide a suitable reference value and comprises the reference signals shown on leads 110 and 116 in FIG. 1.

The collector of transistor 50 is connected to the base of transistor 59, the collector of which is connected through resistor 60 to source 57. The emitter of transistor 59 is connected through resistors 61 and 62 to negative source 55. The positive output of the variable gain amplifier appears at terminal 63, connected to the collector of transistor 59. The negative output of the variable gain amplifier appears at terminal 65, connected to the midpoint of resistors 61 and 62.

Since transistor 52 draws a constant combined current through transistors 50 and 51, as the base voltage on transistor 51 is varied, the amount of current drawn through transistor 51 varies accordingly. The balance of the current drawn by transistor 52 must therefore flow through transistor 50. This provides the variable gain for transistor 50. The input signal, applied to the base of transistor 50, is therefore subjected to a variable gain, depending on the magnitude of the control signal at the base of transistor 51.

Since the control signal at the base of transistor 51 can be varied through a range from total saturation of transistor 51 to total cutoff is transistor 51, the input signal can be made to traverse resistor 13 only or, in varying proportions, to divide between resistor 13 and amplifier 12. In this way, the overall characteristic shown in FIG. 2 can be compensated for by the circuit of FIG. 3.

It should be noted that, as shown in FIG. 1, the control signal for transistor 51 is derived from the peak voltage received over the connected section of telephone cable. This makes manual adjustments unnecessary. The circuit will automatically adjust to compensate for the connected cable section.

Figure 8:
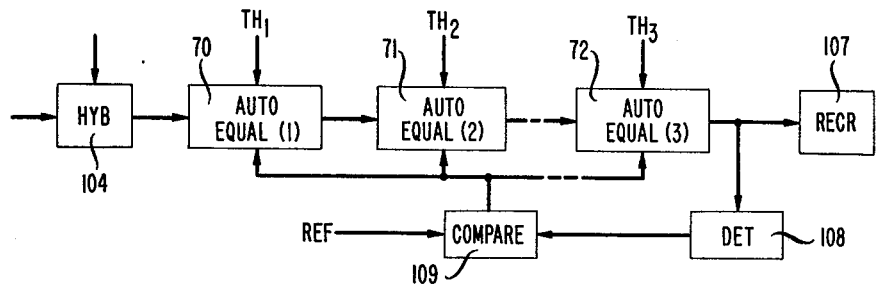
FIG. 8 is a block diagram of the manner in which a plurality of the equalizers of the form shown in FIG. 3 can be cascaded to compensate for longer lengths of telephone cable sections.

In FIG. 8 there is shown the manner in which equalizers of the form shown in FIG. 3 can be cascaded to compensate for any length of cable section. Since the circuit of FIG. 3 is designed to compensate for cable lengths up to a particular maximum cable length, it may become desirable to match longer lengths of cable by cascading a plurality of these networks. Thus, in FIG. 8 there is shown a cascaded network including equalizers 70, 71 and 72 connected in series. Equalizers 70, 71 and 72 are each identical to that shown in FIG. 3 and each is designed for a particular maximum length of telephone cable. The variable gain adjustments in each of these circuits are controlled from the same comparison signal from compare circuit 109.

The networks 70, 71 and 72 can be operated in synchronism so that each contributes part to the compensation for each value of control signal from compare circuit 109. Preferably, however, the networks 70, 71 and 72 are controlled in a stage manner so that network 70 is varied throughout its range of adjustment before network 71 starts to depart from zero gain, and network 72 does not depart from zero gain until network 71 has reached its maximum gain setting. This is easily accomplished by setting the biases on the bases of transistors 50 (FIG. 7) in each equalizer so as to hold transistor 50 cut off until the previous stage is near saturation. If the thresholds (TH1, TH2, TH3) are carefully set, this can be accomplished with virtually no ripple in the overall characteristic.

I claim:

1. A broadband equalizer for telephone subscriber loops
   characterized by
   a variable gain amplifier having a positive and a negative output,
   a first resistive-capacitive network connected to said positive output,
   a second resistive-capacitive network connected to said negative output,
   a resistance connected from the input of said amplifier to a common connection to said first and second networks, and
   means responsive to signals on said telephone subscriber loops for varying the gain of said amplifier.

2. The broadband equalizer according to claim 1 further
   characterized in that
   said amplifier comprises
   a pair of transistors having their emitters connected together,
   a constant current source connected to said emitters,
   means responsive to signals on said telephone subscriber loops for applying a gain control signal to the base of one of said transistors,
   means for applying a staging bias to the base of the other of said transistors, and
   means for translating the unbalanced signal at the collector of the other of said transistors to a balanced signal.

3. The broadband equalizer according to claim 1 further
   characterized in that
   said first network comprises four parallel paths,
   one of said paths including a purely resistive impedance, and
   the others of said paths each including a series connection of a resistor and a capacitor.

4. The broadband equalizer according to claim 1 further
   characterized in that
   said second network comprises two parallel paths, each including a resistor and a capacitor connected in series.

5. The broadband equalizer according to claim 1 further
   characterized by
   a common emitter connected transistor input stage.

6. The broadband equalizer according to claim 1 further
   characterized by a common base connected transistor output stage.

7. An automatic equalizer for digital transmission over twisted pairs of telephone conductors characterized by a minimum phase equalizer circuit connected to receive incoming pulses and having a controllable transfer characteristic with three regions including two regions where gain is proportional to the square root of frequency separated by a transition region where gain has a substantially different variation with frequency, a peak detector for generating an output proportional to the peak amplitude of the output of said equalizing circuit, and means responsive to said detector for controlling the magnitude of said transfer characteristic.

8. The automatic equalizer according to claim 7 further characterized in that said equalizer circuit comprises a pair of frequency-dependent admittances and a frequency-insensitive admittance, and variable gain amplifying means for altering the relative proportion of signal energy from said incoming pulses which flows through said pair and said frequency-insensitive admittance.

9. The automatic equalizer according to claim 7 characterized by input and output impedance transforming stages connected at the input and output, respectively, of said equalizer circuit.

10. An equalizer circuit for transmission lines comprising a minimum phase network having a transfer characteristic substantially proportional to the square root of frequency in two frequency bands separated by a frequency band having a substantially different transfer characteristic, and means responsive to input signals to said equalizer for shifting the amplitude of the overall transfer characteristic.

11. The equalizer circuit according to claim 10 wherein said network includes a frequency-sensitive branch and a frequency-insensitive branch, and said amplitude varying means includes means for varying the gain in said frequency-sensitive branch.

* * * * *